United States Patent Office.

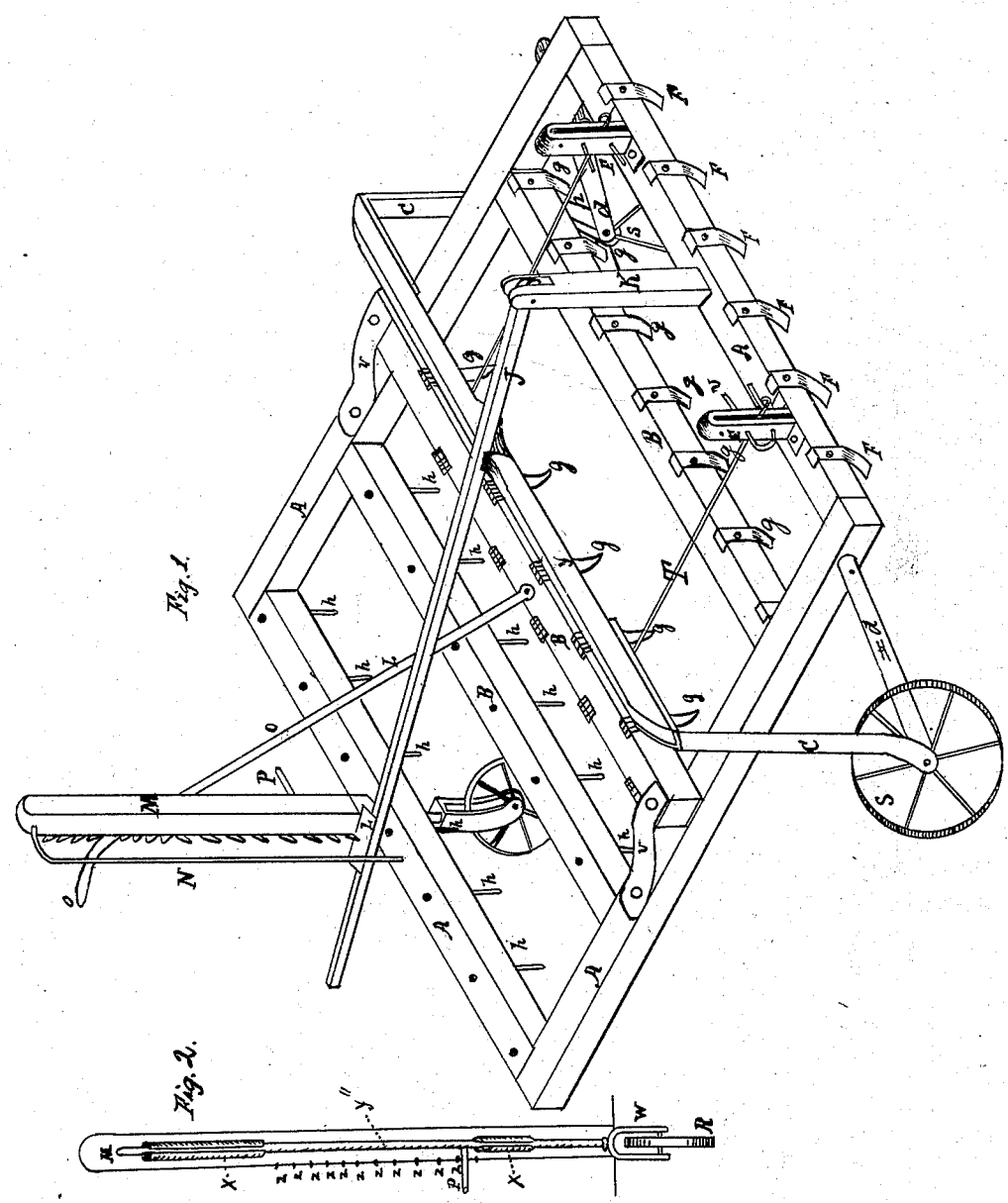

MATHIAS BÖSHENZ, OF CHILI, ILLINOIS.

Letters Patent No. 74,194, dated February 11, 1868.

IMPROVEMENT IN HARROWS.

*The Schedule referred to in these Letters Patent and making part of the same.*

TO ALL WHOM IT MAY CONCERN:

Be it known that I, MATHIAS BÖSHENZ, of Chili, in the county of Hancock, and State of Illinois, have invented a new and improved Centre-Draught Harrow; and I do hereby declare that the following is a full, clear, and exact description thereof, which will enable others skilled in the art to make and use my invention, reference being had to the accompanying drawings, forming part of this specification.

This invention relates to a new and improved device for harrowing or pulverizing the soil; and the invention consists in providing a harrow with wheels and levers, whereby it may be raised or lowered at will; also, in providing means to prevent the draught raising or keeping the front of harrow off of the ground, and in the peculiar formation thereof, as will be hereinafter described.

Figure 1 is a perspective view of the harrow.
Figure 2 is a sectional representation of rack-pole at rear of frame.
Similar letters of reference indicate corresponding parts.

Letter A, fig. 1, represents a square, (or it may be a rectangular frame,) provided with pieces transversely, to which are attached the teeth $h\,h\,h\,h$, the cultivator-shovels $g\,g\,g\,g$, and the cutters $F\,F\,F\,F$. The cutters $F\,F\,F\,F$ are attached to the forward pieces, in order to thoroughly cut up all stalks, sods, &c. The cultivator-shovels $g$ follow them, and tend to completely stir up and loosen the soil. These are followed by the ordinary harrow-teeth, which pulverize and smooth off the surface, leaving it in fine condition. The cutters $F\,F\,F\,F$ are attached by being bolted, "flat side on," to the frame-piece, and are twisted just at lower edge of piece, to throw the edge forward and give it strength. The bar D is pivoted to the side of main frame at forward end, and carries, at the other end, the wheel S. From the outer end of the journal of the wheel S is raised the vertical bar $c$, on either side of the main frame, and connected at the top end by the cross-piece $y$. The lever J is pivoted to the upright K, and is attached to the centre of the cross-piece $y$ in such manner as to form a lever projecting in rear of harrow, by means of which, and the rack Q, the wheels S may be lowered, as seen in the drawing at fig. 1, and the harrow lifted off the ground, in which position it may be easily balanced by the handle O, while turning at the end of rows, &c. The lever J is held in the above position by the rack Q and catch L. By releasing the catch and running it up the rack to near the top, the harrow is dropped to the work intended, or it may be run up the rack at any desired height, and the teeth, &c., be regulated to any depth, at pleasure. Letter M, fig. 2, carries, at its rear side, a vertical rod, $y''$, fig. 2, held in position by the open cylinders $x\,x$, through which it has a vertical movement, for the purpose of raising and lowering the wheel R, attached at the lower end of it by a swivel. This rod, $y''$, is adjusted vertically by means of the rack $z\,z\,z\,z$, fig. 2, and the handle P, which engages with the teeth of rack $z\,z$.

When the harrow is in use, the rod $y''$ and wheel R are run up, but when moving or transporting the harrow from place to place, the wheel R and rod $y''$ are run down in connection with the wheels S S, and the harrow raised entirely free from the ground and balanced on the three wheels.

Letters T T, fig. 1, represent the draught-rods, which are attached to the centre cross-piece B of the main frame, and pass through the slotted upright E, at forward side of harrow. The upright E is provided with holes and the pin U, for vertical adjustment of the draught-rods T T. By means of this adjustment the forward side or end of harrow may be made to "ride" heavy or light on the ground.

Having thus described my invention, what I claim as new, and desire to secure by Letters Patent, is—

1. The bars $c$, $d$, and $y$, the lever J, the upright K, all constructed and arranged as described, and combined with the frame A, substantially as specified and for the purpose set forth.

2. The bars $c$, $d$, and $y$, the lever J, the upright K, combined and arranged as described, in combination with the rod $y''$ and wheel R, substantially as described and for the purpose set forth.

3. The rods T, in combination with uprights E, combined, arranged, and attached as described, and for the purpose set forth.

4. The cutters F F F F, attached as described, and for the purpose set forth.

MATHIAS BÖSHENZ.

Witnesses:
ALBERT HOLMES,
STEPHEN GRIPP.